United States Patent
Dwivedi et al.

(10) Patent No.: US 12,073,563 B2
(45) Date of Patent: Aug. 27, 2024

(54) SYSTEMS AND METHODS FOR BIRDS EYE VIEW SEGMENTATION

(71) Applicant: Honda Motor Co., Ltd., Tokyo (JP)

(72) Inventors: Isht Dwivedi, Mountain View, CA (US); Yi-Ting Chen, Hsinchu (TW); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 17/710,807

(22) Filed: Mar. 31, 2022

(65) Prior Publication Data
US 2022/0414887 A1 Dec. 29, 2022

Related U.S. Application Data

(60) Provisional application No. 63/215,259, filed on Jun. 25, 2021.

(51) Int. Cl.
*G06T 7/10* (2017.01)
*G06T 7/50* (2017.01)
(Continued)

(52) U.S. Cl.
CPC .................. *G06T 7/10* (2017.01); *G06T 7/50* (2017.01); *G06T 17/05* (2013.01);
(Continued)

(58) Field of Classification Search
CPC .. G06T 7/10; G06T 7/50; G06T 17/05; G06T 2207/10028; G06T 2207/20021;
(Continued)

(56) References Cited

U.S. PATENT DOCUMENTS

2014/0376804 A1* 12/2014 Akata ............... G06F 18/21345
382/159
2019/0050648 A1* 2/2019 Stojanovic ............. G06V 20/13
(Continued)

OTHER PUBLICATIONS

Chien-Yi Wang, Athma Narayanan, Abhishek Patil, Wei Zhan, and Yi-Ting Chen. A 3d dynamic scene analysis framework for development of intelligent transportation systems. In Proceedings of IEEE Intelligent Vehicles Symposium, 2018.
(Continued)

*Primary Examiner* — Michael Le
(74) *Attorney, Agent, or Firm* — RANKIN, HILL & CLARK LLP

(57) ABSTRACT

Systems and methods for bird's eye view (BEV) segmentation are provided. In one embodiment, a method includes receiving an input image from an image sensor on an agent. The input image is a perspective space image defined relative to the position and viewing direction of the agent. The method includes extracting features from the input image. The method includes estimating a depth map that includes depth values for pixels of the plurality of pixels of the input image. The method includes generating a 3D point map including points corresponding to the pixels of the input image. The method includes generating a voxel grid by voxelizing the 3D point map into a plurality voxels. The method includes generating a feature map by extracting feature vectors for pixels based on the points included in the voxels of the plurality of voxels and generating a BEV segmentation based on the feature map.

20 Claims, 8 Drawing Sheets

(51) Int. Cl.
  *G06T 17/05* (2011.01)
  *G06V 10/77* (2022.01)
  *G06V 10/774* (2022.01)
  *G06V 10/82* (2022.01)
(52) U.S. Cl.
  CPC ...... *G06V 10/7715* (2022.01); *G06V 10/7747* (2022.01); *G06V 10/82* (2022.01); *G06T 2207/10028* (2013.01); *G06T 2207/20021* (2013.01); *G06T 2207/20081* (2013.01); *G06T 2207/20084* (2013.01); *G06T 2210/56* (2013.01)
(58) Field of Classification Search
  CPC . G06T 2207/20081; G06T 2207/20084; G06T 2210/56; G06T 17/00; G06T 2207/10024; G06T 2207/30252; G06T 7/11; G06V 10/7715; G06V 10/7747; G06V 10/82; G06V 20/56; G06V 20/17; G06V 10/26
  See application file for complete search history.

(56) References Cited

U.S. PATENT DOCUMENTS

| | | | | |
|---|---|---|---|---|
| 2020/0211375 | A1* | 7/2020 | Vig | G08G 1/09626 |
| 2021/0150203 | A1* | 5/2021 | Liu | G06V 20/56 |
| 2021/0150230 | A1* | 5/2021 | Smolyanskiy | G06V 20/56 |
| 2021/0213973 | A1* | 7/2021 | Carillo Peña | B60W 60/0011 |
| 2021/0279503 | A1* | 9/2021 | Qi | G06V 10/462 |
| 2021/0334556 | A1* | 10/2021 | Vignard | G06V 20/58 |
| 2021/0406560 | A1* | 12/2021 | Park | G06T 7/70 |

OTHER PUBLICATIONS

Jia-Wang Bian, Zhichao Li, Naiyan Wang, Huangying Zhan, Chunhua Shen, Ming-Ming Cheng, and Ian Reid. Unsupervised scale-consistent depth learning from video. International Journal of Computer Vision (IJCV), 2021.
Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. nuscenes: A multimodal dataset for autonomous driving. In Proceedings of the IEEE/CVF conference on computer vision and pattern recognition, pp. 11621-11631, 2020.
Ming-Fang Chang, John Lambert, Patsorn Sangkloy, Jagjeet Singh, Slawomir Bak, Andrew Hartnett, DeWang, Peter Carr, Simon Lucey, Deva Ramanan, et al. Argoverse: 3d tracking and forecasting with rich maps. In Proceedings of the IEEE/CVF Conference on Computer Vision and Pattern Recognition, pp. 8748-8757, 2019.
Liang-Chieh Chen, George Papandreou, Florian Schroff, and Hartwig Adam. Rethinking atrous convolution for semantic image segmentation. In Proceedings of the IEEE Conference on Computer Vision and Pattern Recognition, 2017.
Liang-Chieh Chen, George Papandreou, Florian Schroff, and Hartwig Adam. Rethinking atrous convolution for semantic image segmentation. arXiv preprint arXiv:1706.05587, 2017.
Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.
Liuyuan Deng, Ming Yang, Hao Li, Tianyi Li, Bing Hu, and Chunxiang Wang. Restricted deformable convolution-based road scene semantic segmentation using surround view cameras. IEEE Transactions on Intelligent Transportation Systems, 21 (10):4350-4362, 2019.
Andreas Geiger, Martin Lauer, ChristianWojek, Christoph Stiller, and Raquel Urtasun. 3d traffic scene understanding from movable platforms. Pattern Analysis and Machine Intelligence (PAMI), 2014.
Clément Godard, Oisin Mac Aodha, and Gabriel J Brostow. Unsupervised monocular depth estimation with left-right consistency. In Proceedings of the IEEE Conference on Computer Vision and Pattern Recognition, pp. 270-279, 2017.
Vitor Guizilini, Rares Ambrus, Sudeep Pillai, Allan Raventos, and Adrien Gaidon. 3d packing for self-supervised monocular depth estimation. In Proceedings of the IEEE/CVF Conference on Computer Vision and Pattern Recognition, pp. 2485-2494, 2020.
Kaiming He, Xiangyu Zhang, Shaoqing Ren, and Jian Sun. Identity mappings in deep residual networks. In European conference on computer vision, pp. 630-645. Springer, 2016.
Jason Ku, Melissa Mozifian, Jungwook Lee, Ali Harakeh, and Steven L Waslander. Joint 3d proposal generation and object detection from view aggregation. In 2018 IEEE/RSJ International Conference on Intelligent Robots and Systems (IROS), pp. 1-8. IEEE, 2018.
Alex H Lang, Sourabh Vora, Holger Caesar, Lubing Zhou, Jiong Yang, and Oscar Beijbom. Pointpillars: Fast encoders for object detection from point clouds. In Proceedings of the IEEE/CVF Conference on Computer Vision and Pattern Recognition, pp. 12697-12705, 2019.
Buyu Liu, Bingbing Zhuang, Samuel Schulter, Pan Ji, and Manmohan Chandraker. Understanding road layout from videos as a whole. In Proceedings of the IEEE/CVF Conference on Computer Vision and Pattern Recognition, pp. 4414-4423, 2020.
Chenyang Lu, Marinus Jacobus Gerardus van de Molengraft, and Gijs Dubbelman. Monocular semantic occupancy grid mapping with convolutional variational encoder-decoder networks. IEEE Robotics and Automation Letters, 4 (2):445-452, 2019.
Fangchang Ma and Sertac Karaman. Sparse-to-dense: Depth prediction from sparse depth samples and a single image. In 2018 IEEE International Conference on Robotics and Automation (ICRA), pp. 4796-4803. IEEE, 2018.
Daniel Maturana, Po-Wei Chou, Masashi Uenoyama, and Sebastian Scherer. Real-time semantic mapping for autonomous off-road navigation. In Field and Service Robotics, 2018.
Gerhard Neuhold, Tobias Ollmann, Samuel Rota Bulo, and Peter Kontschieder. The mapillary vistas dataset for semantic understanding of street scenes. In Proceedings of the IEEE International Conference on Computer Vision, 2017.
Mong H Ng, Kaahan Radia, Jianfei Chen, DequanWang, Ionel Gog, and Joseph E Gonzalez. Bev-seg: Bird's eye view semantic segmentation using geometry and semantic point cloud. arXiv preprint arXiv:2006.11436, 2020.
Bowen Pan, Jiankai Sun, Ho Yin Tiga Leung, Alex Andonian, and Bolei Zhou. Crossview semantic segmentation for sensing surroundings. IEEE Robotics and Automation Letters, 5(3):4867-4873, 2020.
David Paz, Hengyuan Zhang, Qinru Li, Hao Xiang, and Henrik Christensen. Probabilistic semantic mapping for urban autonomous driving applications. In Proceedings of International Conference on Intelligent Robots and Systems, 2020.
Jonah Philion and Sanja Fidler. Lift, splat, shoot: Encoding images from arbitrary camera rigs by implicitly unprojecting to 3d. In European Conference on Computer Vision, pp. 194-210. Springer, 2020.
Charles R Qi, Wei Liu, ChenxiaWu, Hao Su, and Leonidas J Guibas. Frustum pointnets for 3d object detection from rgb-d data. In Proceedings of the IEEE conference on computer vision and pattern recognition, pp. 918-927, 2018.
Thomas Roddick and Roberto Cipolla. Predicting semantic map representations from images using pyramid occupancy networks. In Proceedings of the IEEE/CVF Conference on Computer Vision and Pattern Recognition, pp. 11138-11147, 2020.
Thomas Roddick, Alex Kendall, and Roberto Cipolla. Orthographic feature transform for monocular 3d object detection In Proceedings of British Machine Vision Conference, 2019.
Johannes L Schönberger and Jan-Michael Frahm. Structure-from-motion revisited. In Proceedings of the IEEE conference on computer vision and pattern recognition, pp. 4104-4113, 2016.
Johannes L Schönberger, Enliang Zheng, Jan-Michael Frahm, and Marc Pollefeys. Pixelwise view selection for unstructured multi-view stereo. In European Conference on Computer Vision, pp. 501-518. Springer, 2016.
Samuel Schulter, Menghua Zhai, Nathan Jacobs, and Manmohan Chandraker. Learning to look around objects for top-view repre-

(56) References Cited

OTHER PUBLICATIONS sentations of outdoor scenes. In Proceedings of the European Conference on Computer Vision, pp. 787-802, 2018.
Sunando Sengupta, Paul Sturgess, L'ubor Ladický, and Philip H. S. Torr. Automatic dense visual semantic mapping from street-level imagery. In Proceedings of International Conference on Intelligent Robots and Systems, 2012.
Yan Wang, Wei-Lun Chao, Divyansh Garg, Bharath Hariharan, Mark Campbell, and Kilian QWeinberger. Pseudo-lidar from visual depth estimation: Bridging the gap in 3d object detection for autonomous driving. In Proceedings of the IEEE/CVF Conference on Computer Vision and Pattern Recognition, pp. 8445-8453, 2019.
Ziyan Wang, Buyu Liu, Samuel Schulter, and Manmohan Chandraker. A parametric top-view representation of complex road scenes. In Proceedings of the IEEE/CVF Conference on Computer Vision and Pattern Recognition, pp. 10325-10333, 2019.
Xinshuo Weng and Kris Kitani. Monocular 3d object detection with pseudo-lidar point cloud. In Proceedings of the IEEE/CVF International Conference on Computer Vision Workshops, 2019.
Bin Xu and Zhenzhong Chen. Multi-level fusion based 3d object detection from monocular images. In Proceedings of the IEEE conference on computer vision and pattern recognition, pp. 2345-2353, 2018.
Yuhui Yuan, Xilin Chen, and JingdongWang. Object-contextual representations for semantic segmentation. In Proceedings of the European Conference on Computer Vision, 2020.

\* cited by examiner

SYSTEMS AND METHODS FOR BIRDS EYE VIEW SEGMENTATION

BACKGROUND

Semantic mapping for outdoor navigation provides semantic abstractions of traffic scenes. Current methods generally use multi-modal sensory inputs (i.e., LiDAR and camera) to obtain geometric and semantic information for semantic mapping. However, data generated from active sensors such as LiDAR perform sparse measurements, have low scan rates, and have prohibitively high cost. Surround view cameras have a ubiquitous presence due to their low-cost and are more suitable for generating semantically meaningful and dense per-pixel representation of the surrounding scene. Stereo camera systems may be used to generate a 3D representation of the scene. However, their calibration and synchronization process is non-trivial and difficult to scale for deployment in production systems.

BRIEF DESCRIPTION

According to one aspect, a system for bird's eye view (BEV) segmentation is provided. The system includes a memory storing instructions that when executed by a processor cause the processor to receive an input image from an image sensor on an agent. The input image is a perspective space image defined relative to the position and viewing direction of the agent. The image sensor is associated with intrinsic parameters. The input image includes a plurality pixels. The instructions also cause the processor to extract features from the input image using a first neural network (NN). A feature is a piece of information about the content of the input image. The instructions further cause the processor to estimate a depth map that includes depth values for pixels of the plurality of pixels of the input image. The instructions yet further cause the processor to generate a three-dimensional (3D) point map based on the depth map and the intrinsic parameters of the image sensor. The 3D point map includes points corresponding to the pixels of the input image. The instructions also cause the processor to generate a voxel grid by voxelizing the 3D point map into a plurality voxels. Voxels of the plurality of voxels include a variable number of points. The instructions further cause the processor to generate a feature map by extracting feature vectors for pixels based on the points included in the voxels of the plurality of voxels. The instructions yet further cause the processor to generate a BEV segmentation based on the feature map.

According to another aspect, a method for bird's eye view (BEV) segmentation is provided. The method includes receiving an input image from an image sensor on an agent. The input image is a perspective space image defined relative to the position and viewing direction of the agent. The image sensor is associated with intrinsic parameters. The input image includes a plurality pixels. The method also includes extracting features from the input image using a first neural network (NN). A feature is a piece of information about the content of the input image. The method further includes estimating a depth map that includes depth values for pixels of the plurality of pixels of the input image. The method further includes generating a three-dimensional (3D) point map based on the depth map and the intrinsic parameters of the image sensor. The 3D point map includes points corresponding to the pixels of the input image. The method includes generating a voxel grid by voxelizing the 3D point map into a plurality voxels. Voxels of the plurality of voxels include a variable number of points. The method also includes generating a feature map by extracting feature vectors for pixels based on the points included in the voxels of the plurality of voxels. The method further includes generating a BEV segmentation based on the feature map.

According to a further aspect, a non-transitory computer readable storage medium storing instructions that when executed by a computer having a processor to perform a method for bird's eye view (BEV) segmentation is provided. The method includes receiving an input image from an image sensor on an agent. The input image is a perspective space image defined relative to the position and viewing direction of the agent. The image sensor is associated with intrinsic parameters. The input image includes a plurality pixels. The method also includes extracting features from the input image using a first neural network (NN). A feature is a piece of information about the content of the input image. The method further includes estimating a depth map that includes depth values for pixels of the plurality of pixels of the input image. The method yet further includes generating a three-dimensional (3D) point map based on the depth map and the intrinsic parameters of the image sensor. The 3D point map includes points corresponding to the pixels of the input image. The method includes generating a voxel grid by voxelizing the 3D point map into a plurality voxels. Voxels of the plurality of voxels include a variable number of points. The method also includes generating a feature map by extracting feature vectors for pixels based on the points included in the voxels of the plurality of voxels. The method further includes generating a BEV segmentation based on the feature map.

DETAILED DESCRIPTION

Figure 1:
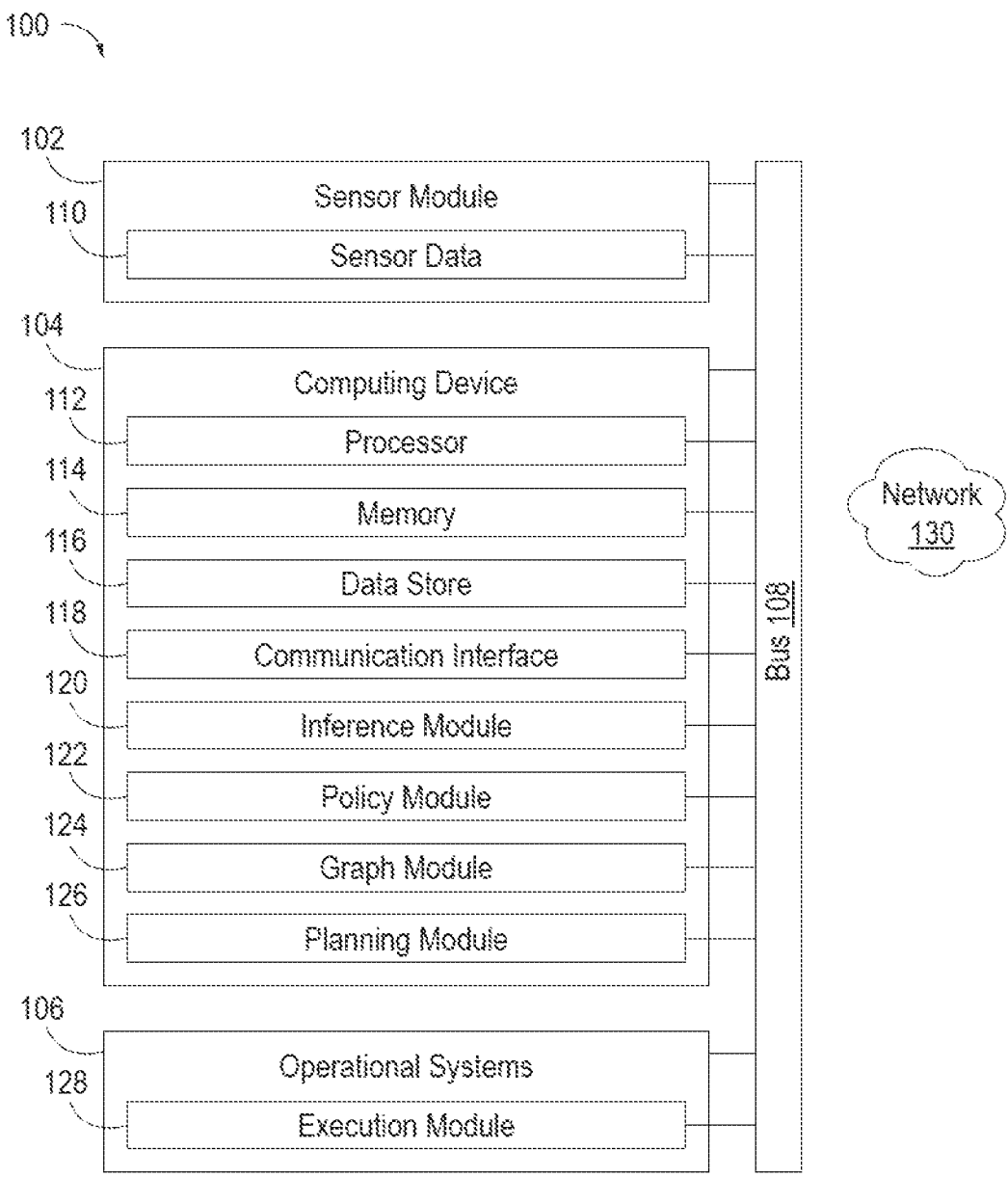
FIG. 1 is an exemplary component diagram of a system for Bird's Eye View (BEV) segmentation, according to one aspect.

Systems and methods for BEV segmentation are provided herein. As discussed above, current methods typically use multi-modal sensory inputs (i.e., LiDAR and camera) to obtain geometric and semantic information for semantic mapping that assume a flat world. In the systems and methods described herein, a flat world constraint toward practical applications is not assumed. Instead, to obtain the Bird's Eye View (BEV) representation of a local map, given a perspective-view image, depths for the perspective-view image are estimated. A BEV image may then be generated by reconstructing the corresponding perspective-view image using the estimated depth. Furthermore, the systems and methods described herein provide a framework that jointly considers the BEV image and semantic information for BEV segmentation. In this manner, a segmented BEV image may be generated from an image sensor on a mobile agent.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is powered entirely or partially by one or more electric motors powered by an electric battery. The EV may include battery electric vehicles and plug-in hybrid electric vehicles (PHEV). The term "vehicle" may also refer to an autonomous vehicle and/or self-driving vehicle powered by any form of energy.

I. System Overview

Referring now to the drawings, the drawings are for purposes of illustrating one or more exemplary embodiments and not for purposes of limiting the same. FIG. 1 is an exemplary component diagram of an operating environment 100 for BEV segmentation, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2:
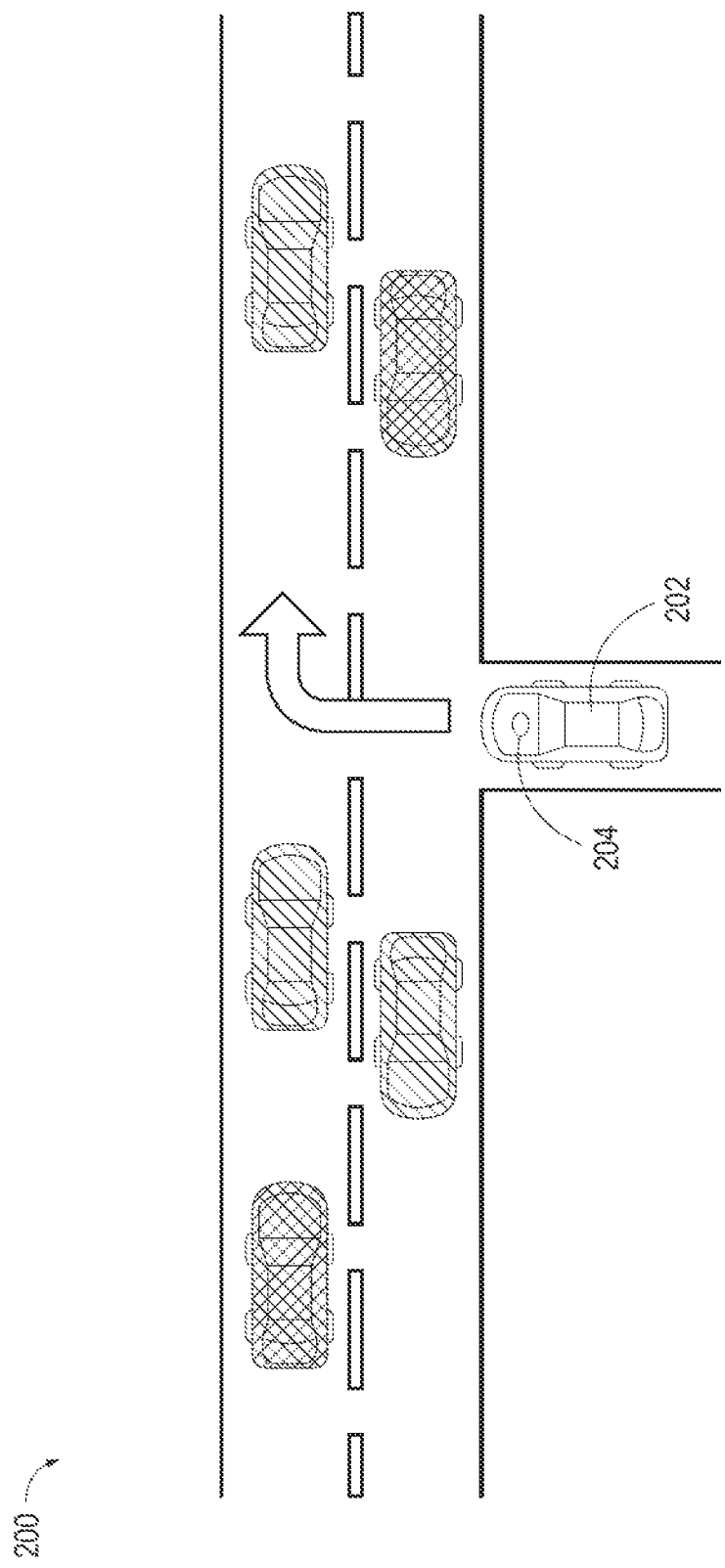
FIG. 2 is an exemplary agent environment of a system for BEV segmentation, according to one aspect.

The computing device 104 may be implemented as a part of an ego agent, such as the ego agent 202 of the roadway 200, shown in FIG. 2. The ego agent 202 may be a bipedal, two-wheeled or four-wheeled robot, a vehicle, or a self-propelled machine. For example, in another embodiment, the ego agent 202 may be configured as a humanoid robot. The ego agent 202 may take the form of all or a portion of a robot. The computing device 104 may be implemented as part of a telematics unit, a head unit, a navigation unit, an infotainment unit, an electronic control unit, among others of the ego agent 202. In other embodiments, the components and functions of the computing device 104 may be implemented with other devices (e.g., a portable device) or another device connected via a network (e.g., a network 130).

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The ego agent 202 may include sensors for sensing objects and the roadway 200. For example, the ego agent 202 may include an image sensor 204. The image sensor 204 may be a light sensor to capture light data from around the ego agent 202. For example, a light sensor may rotate 360 degrees around ego agent 202 and collect the sensor data 110 in sweeps. Conversely, an image sensor 204 may be omnidirectional and collect sensor data 110 from all directions simultaneously. The image sensor 204 of an agent may emit one or more laser beams of ultraviolet, visible, or near infrared light toward the surrounding environment of the ego agent 202. In some embodiments, the image sensor 204 may be a monocular camera.

The image sensor 204 may positioned on the ego agent 202. For example, suppose that the ego agent 202 is a vehicle. One or more sensors may be positioned at external front and/or side portions of the ego agent 202, including, but not limited to different portions of the vehicle bumper, vehicle front lighting units, vehicle fenders, and the windshield. Additionally, the sensors may be disposed at internal portions of the ego agent 202 including, in a vehicular embodiment, the vehicle dashboard (e.g., dash mounted camera), rear side of a vehicle rear view mirror, etc. Sensors may be positioned on a planar sweep pedestal (not shown) that allows the image sensor 204 to be rotated to capture images of the environment at various angles.

The image sensor 204 is associated with intrinsic parameters. The intrinsic parameters link the pixel coordinates of an image with corresponding coordinates in the camera reference frame. The intrinsic parameters identify the transformation between the camera reference frame and the world reference frame. For example, the intrinsic parameters may include the position, angle, field of view (FOV), location, etc. of the image sensor 204, the size of pixels in the image, and the orientation of the image sensor 204, among others.

Accordingly, the sensors, such as the image sensor 204, and/or the sensor module 102 are operable to sense a measurement of data associated with the ego agent 202, the operating environment 100, the roadway 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module as an input image. Based on the location of the image sensor 204, the input image may be a perspective space image defined relative to the position and viewing direction of the ego agent 202.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a feature module 120, a depth module 122, a voxel grid module 124, and a BEV segmentation module 126 for BEV segmentation facilitated by the components of the operating environment 100.

The feature module 120, the depth module 122, the voxel grid module 124 and/or the BEV segmentation module 126, may be artificial neural networks that act as a framework for machine learning, including deep reinforcement learning. For example, the feature module 120, the depth module 122, the voxel grid module 124 and/or the BEV segmentation module 126 may be a convolution neural network (CNN). In one embodiment, the feature module 120, the depth module 122, the voxel grid module 124 and/or the BEV segmentation module 126 may include a conditional generative adversarial network (cGAN). In some embodiments, the BEV segmentation module 126 may utilize a BEV CNN is trained using a dataset that include training images. The training images may include both perspective view and BEV, that are annotated with labels. The training images may also be annotated with classes are populated by attributes associated with environmental characteristics.

One or more of the feature module 120, the depth module 122, the voxel grid module 124 and the BEV segmentation module 126 may be a graphical representation neural network that is applied to graphical representation structures. In another embodiment, the feature module 120, the depth module 122, the voxel grid module 124 and/or the BEV segmentation module 126 may include an input layer, an output layer, and one or more hidden layers, which may be convolutional filters. In some embodiments, one or more of the modules may include Long Short Term Memory (LSTM) networks and LSTM variants (e.g., E-LSTM, G-LSTM, etc.).

The computing device 104 is also operably connected for computer communication (e.g., via the bus 108 and/or the communication interface 118) to one or more operational systems 106. The operational systems 106 may include, but are not limited to, any automatic or manual systems that may be used to enhance the ego agent 202, operation, and/or safety. The operational systems 106 include an execution module 128. The execution module 128 monitors, analyses, and/or operates the ego agent 202, to some degree. For example, the execution module 128 may store, calculate, and provide directional information and facilitate features like vectoring and obstacle avoidance among others. In a vehicular embodiment, the execution module 128 may provide operational data to vehicle systems, such as the steering system, that cause the ego agent 202 to operate autonomously. In some embodiments, the execution module 128 may be a Proportional, Integral, Derivative (PID) controller. Continuing the vehicular embodiment described above, the execution module 128 may be a longitudinal PID controller. The operational systems 106 may be dependent on the implementation.

The operational systems 106 also include and/or are operably connected for computer communication to the sensor module 102. For example, one or more sensors of the sensor module 102, such as the image sensor 204, may be incorporated with execution module 128 to monitor characteristics of the environment of the ego agent 202 or the ego agent 202 itself. For example, in the vehicular embodiment, the image sensor 204 may be incorporated with execution module 128 to monitor characteristics of the roadway 200. Suppose that the execution module 128 is facilitating execution of a right turn onto a street. The execution module 128 may receive sensor data 110 from the sensor module 102 to confirm that vehicles present on the street are yielding as expected.

The sensor module 102, the computing device 104, and/or the operational systems 106 are also operatively connected for computer communication to the network 130. The network 130 is, for example, a data network, the Internet, a wide area network (WAN) or a local area (LAN) network.

The network 130 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Bev Segmentation

Figure 3:
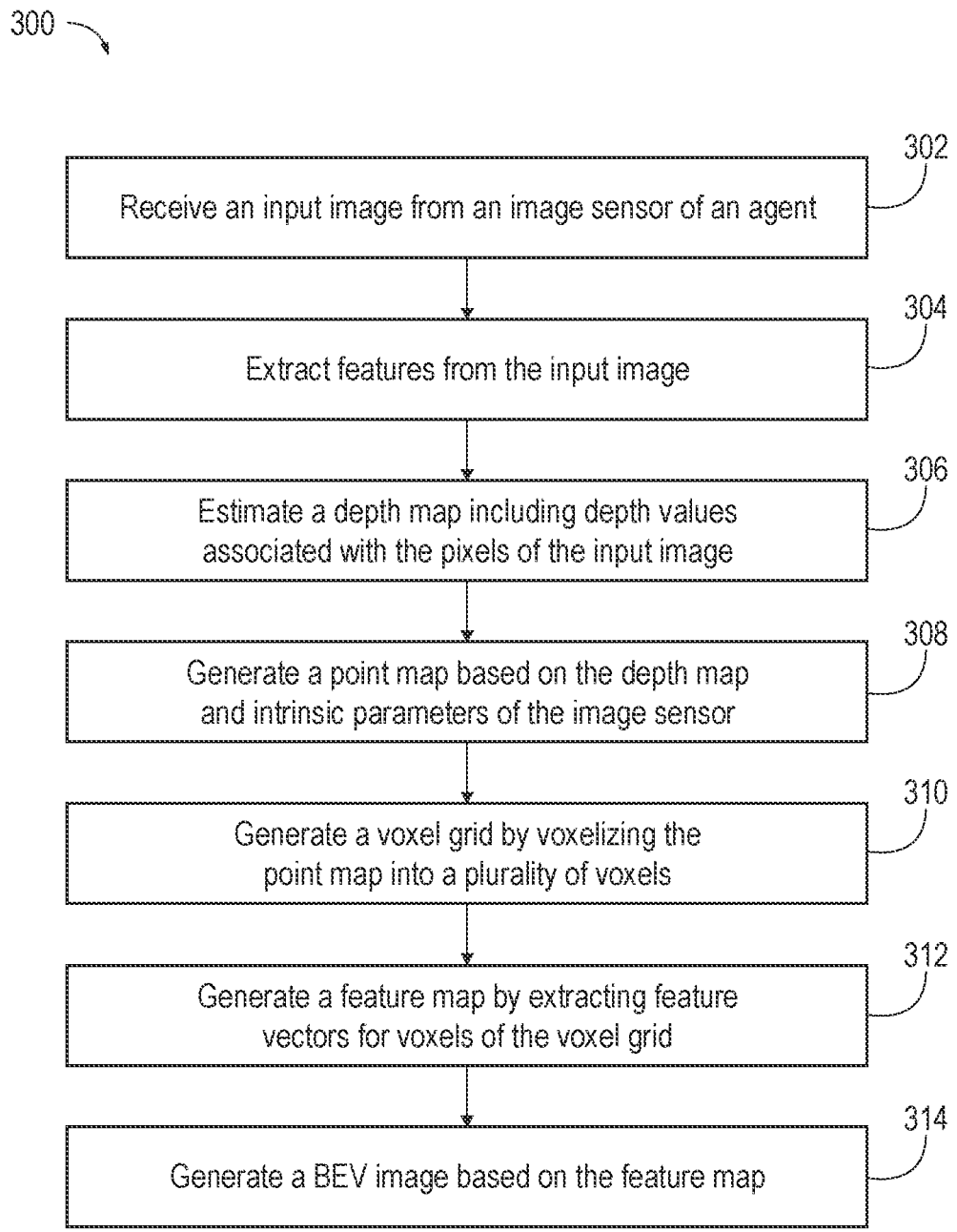
FIG. 3 is an exemplary process flow of a method for BEV segmentation, according to one aspect.

Referring now to FIG. 3, a method 300 for BEV segmentation will now be described according to an exemplary embodiment. FIG. 3 will also be described with reference to FIGS. 1, 2, and 4-8. For simplicity, the method 300 will be described as a sequence of elements, but it is understood that the elements of the method 300 may be organized into different architectures, blocks, stages, and/or processes.

At block 302, the method 300 includes the sensor module 102 receiving sensor data 110. The sensor data 110 may be received from the image sensor 204. The sensor data 110 may include a video sequence or a series of images, user inputs, and/or data from the operational systems 106. In one embodiment, the sensor data 110 includes an input image 402, shown in FIG. 4A. The input image 402 may be a perspective space image defined relative to the position and viewing direction of the ego agent 202. The input image 402 may be a frame of a series of frames selected from the sensor data 110, for example, a video clip.

The sensor data 110 may also include intrinsic parameters associated with the image sensor 204. The sensor data 110 may be received from the image sensor 204. The image sensor 204 may include radar units, lidar units, image capture components, sensors, cameras, scanners (e.g., 2-D scanners or 3-D scanners), or other measurement components. In some embodiments, the sensor data 110 is augmented with additional sensor data from other sources is received. For example, the sensor data 110 from the image sensor 204 may be augmented by other sources, such as a second optical sensor (not shown), and/or remote devices (e.g., via the bus 108 and/or the communication interface 118).

At block 304, the method 300 includes the feature module 120 extracting features from the input image 402. A feature is a piece of information about the content of the input image 402 received as sensor data 110. For example, the features may include information about regions of the input image 402, such as a first branch 404, a second branch 406, and a third branch 408. The features may also include information regarding the relative position between features and the ego agent 202. For example, the features may include an ego branch 410 relative to the ego agent 202. The types of features may be based on the physical environment. For example, in the vehicular embodiment, the features may include the number and width of lanes, distance to various types of intersections, crosswalks, and sidewalks, etc.

Figure 5:
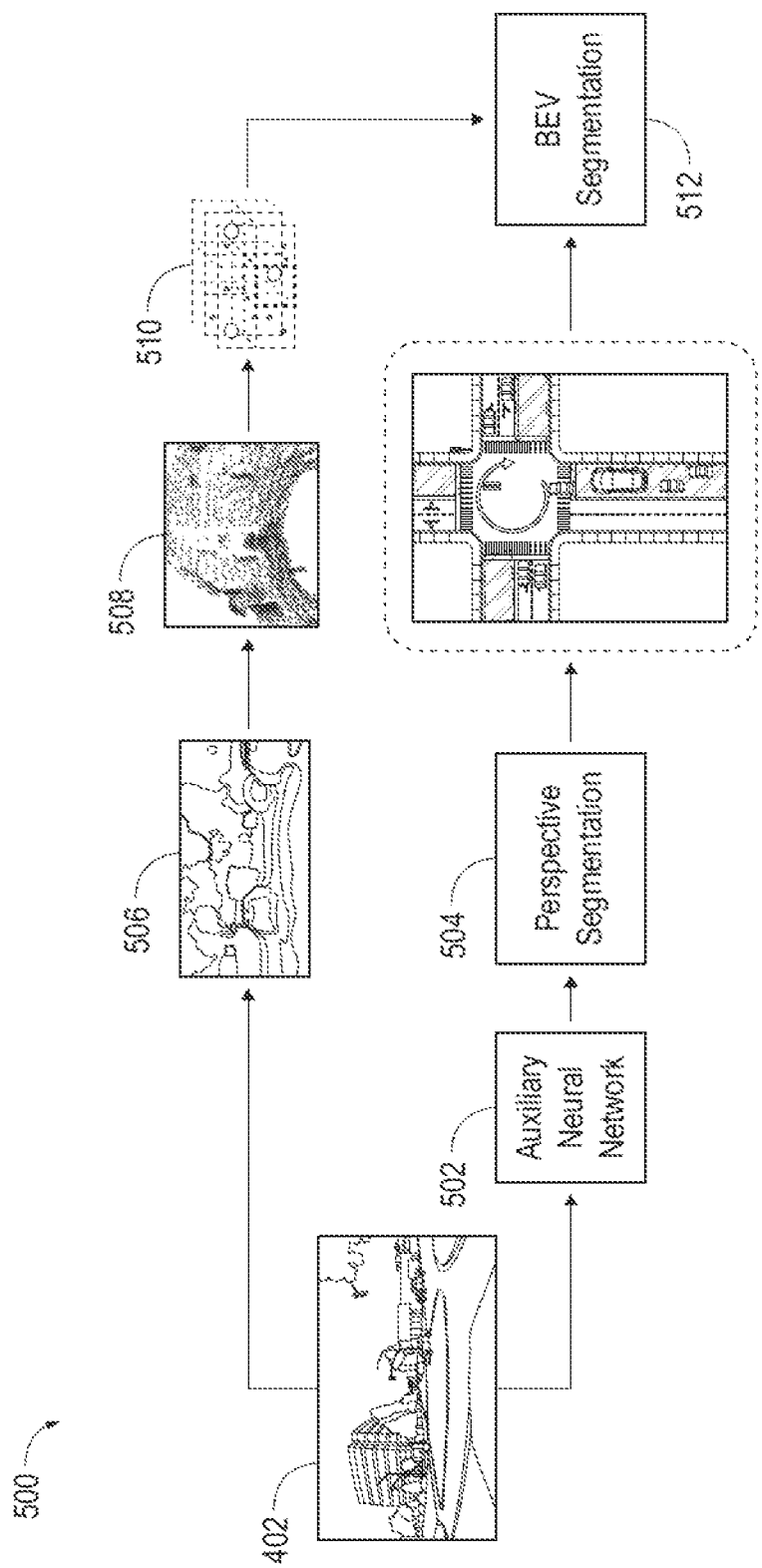
FIG. 5 is an example network architecture of a system for BEV segmentation, according to one aspect.

Turning to FIG. 5, the features may be extracted by the feature module 120 using a first neural network 502 to predict a perspective semantic segmentation 504 as shown in the example network architecture 500. The first neural network 502 may include a stack of residual blocks followed by a convolutional layer. Accordingly, the first neural network may be a convolution neural network. The extracted features may be up-sampled using bilinear interpolation to match a ground truth shape to determine any loss. In some embodiments, the features may be multi-scale features that are extracted using different layers of the first neural network 502.

At block 306, the method 300 includes the depth module 122 estimating a depth map 506 that includes depth values for pixels of a plurality of pixels of the input image 402. The depth values include information relating to the distance between the surfaces of the objects in the input image and the ego agent 202 or the image sensor 204. The depth values may form a depth dataset.

The depth values may be estimated based on a second neural network. The second neural network may be different than the first neural network 502. The depth values contain information relating to relative distances of features from a viewpoint, such as the ego agent 202 or the image sensor 204. The depth values may include a depth map 506, shown in FIG. 5. The depth map 506 includes per-pixel data containing depth-related information. For example, the intensity of each pixel in the depth map 506 is calculated based on a distance between the corresponding point from the point cloud and the view point.

At block 308, the method 300 includes the depth module 122 generating a three-dimensional (3D) point map 508 based on the depth map 506 and the intrinsic parameters of the image sensor 204. The 3D point map includes points corresponding to the pixels of the input image. In one embodiment, at a given pixel location (u, v) of the input image 402, the corresponding pixel is projected into 3D world coordinates of a point map 508 given by $P_{3d}$=(X, Y, Z) using the intrinsic parameters associated with the image sensor 204 and the depth map 506, described in the equation below as D, according to:

$$X = \frac{(u - c_x)Z_{uv}}{f_x};$$

$$Y = \frac{(u - c_y)Z_{uv}}{f_y};$$

$$Z = D[u, v]$$

At block 310, the method 300 includes the voxel grid module 124 generating a voxel grid 510 by voxelizing the point map 508 into a plurality of voxels. Voxels of the plurality of voxels in the voxel grid 510 include a variable number of points. In some embodiments, each point of the point map 508 corresponds to a pixel of the input image 402. The voxel grid may have a size denoted as (h, w, d).

At block 312, the method 300 includes the voxel grid module 124 generating a feature map 512 by extracting feature vectors for pixels based on the points included in the voxel grid 510. In particular, the feature map 512 is based on a length, $l_f$, feature vector for each voxel $V_i$ of the voxel grid 510. The feature map may be represented as a 4d feature map with size (h, w, d, $l_f$).

Each voxel $V_i$ in the voxel grid 510 may contain varying n number of 3D points $(X_i^j, Y_i^j) \in V_j$ for $i \in [1, \ldots, n]$ from the point map 508 corresponding to the pixels $(u_i^j, v_i^j)$ of the input image 402. Accordingly, the 2D pixel locations are stored in the voxel grid 510, denoted by $\tilde{V}$ resulting in $(u_i^j, v_i^j) \in \tilde{V}_j$. Using bilinear interpolation on features F, a feature vector $f_i^j$ of a length $l_f$. The feature corresponding to a voxel, $\tilde{V}_i$, may be the mean of all of the feature vectors of length $l_f$, $$Q_i = \frac{\sum_{i=1}^n f_i^j}{n}$$

Figure 6:
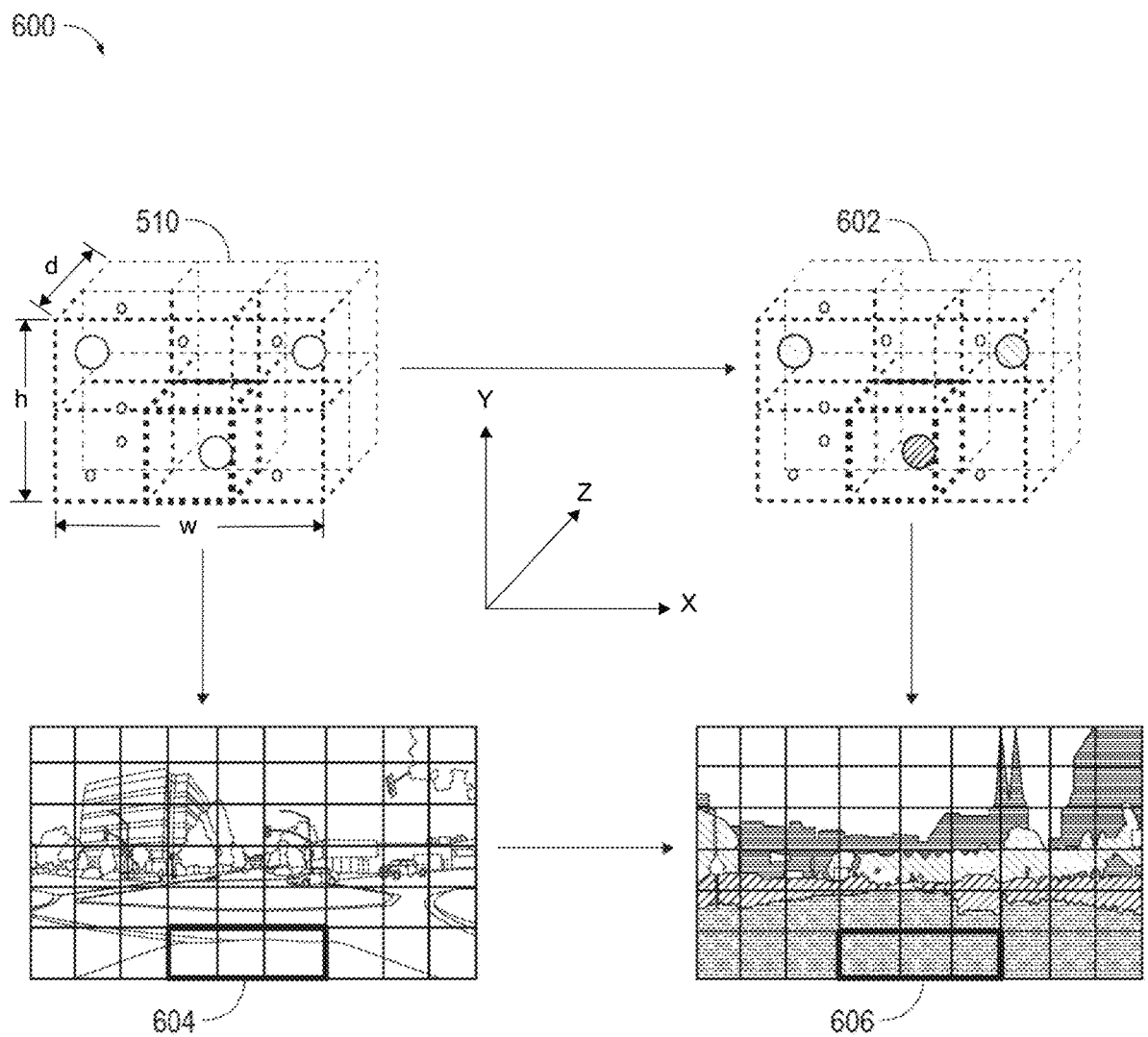
FIG. 6 is an example feature transform layer of a system for BEV segmentation, according to one aspect.

The features are thereby transformed from the perspective space to Q in BEV space. The features are then used by the BEV segmentation module 126 to produce the feature map 512. The feature map 512 may be generating using a BEV neural network to produce the BEV segmentation prediction of the feature map 512. For example, as shown in FIG. 6, each voxel of the voxel grid 510 includes a variable number of points corresponding to one or more pixels of the input image 402. Accordingly, the voxel grid module 124 may apply the voxel grid 510 for index referencing the input image 402 as an indexed image 602. The features of perspective frame 604, based on the indexed image 602, may be combined with the voxel grid 510 for feature fusion 606 to predict the feature map 512.

In some embodiments, cross-entropy loss may be performed to train one or more of the neural networks, such as the first neural network 502. For example, features may be identified by the first neural network 502 based on a training dataset. Different classes of the training dataset may be overlapping. Therefore, each class may be paired with a background class to produce two maps for each class. A separate cross-entropy loss is calculated for each class. The loss of each class is then weighted by the square root of the inverse class frequency. The weighted mean of all the losses is the total loss in these cases, $$L_{BEV} = \sum_{i=1}^{n} w_i L_i$$

where $w_i$, $L_i$ are the weight and loss for the $i^{th}$ class and n is the number of classes in the dataset.

Figure 4A:
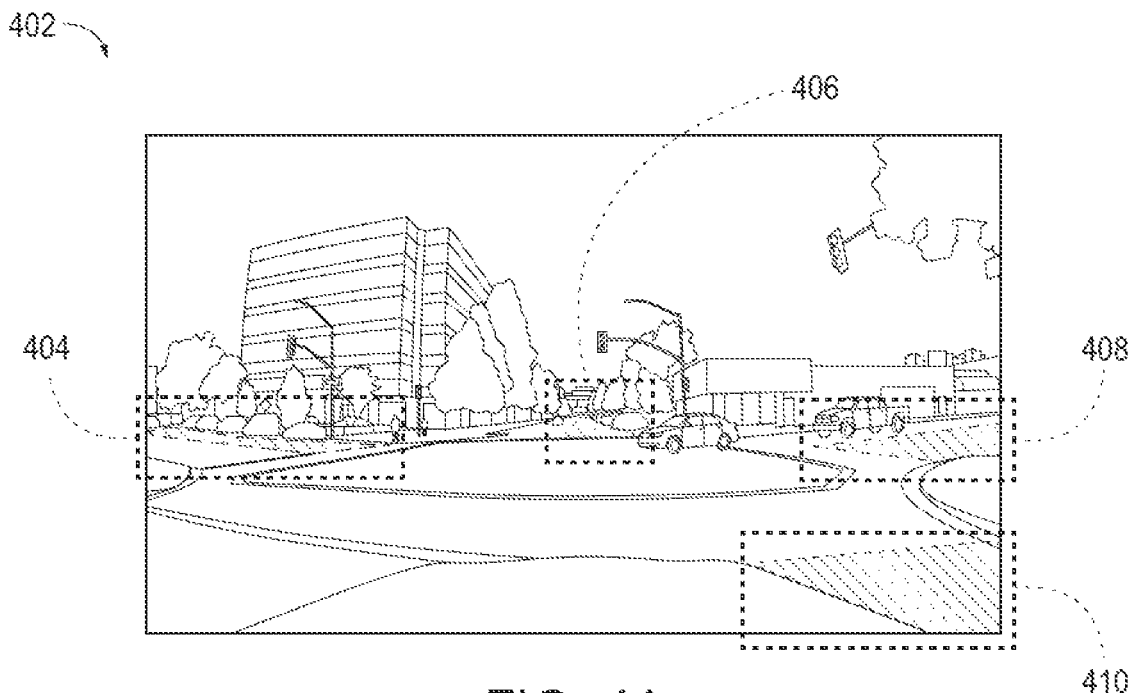
FIG. 4A is an example input image, according to one aspect.
Figure 4B:
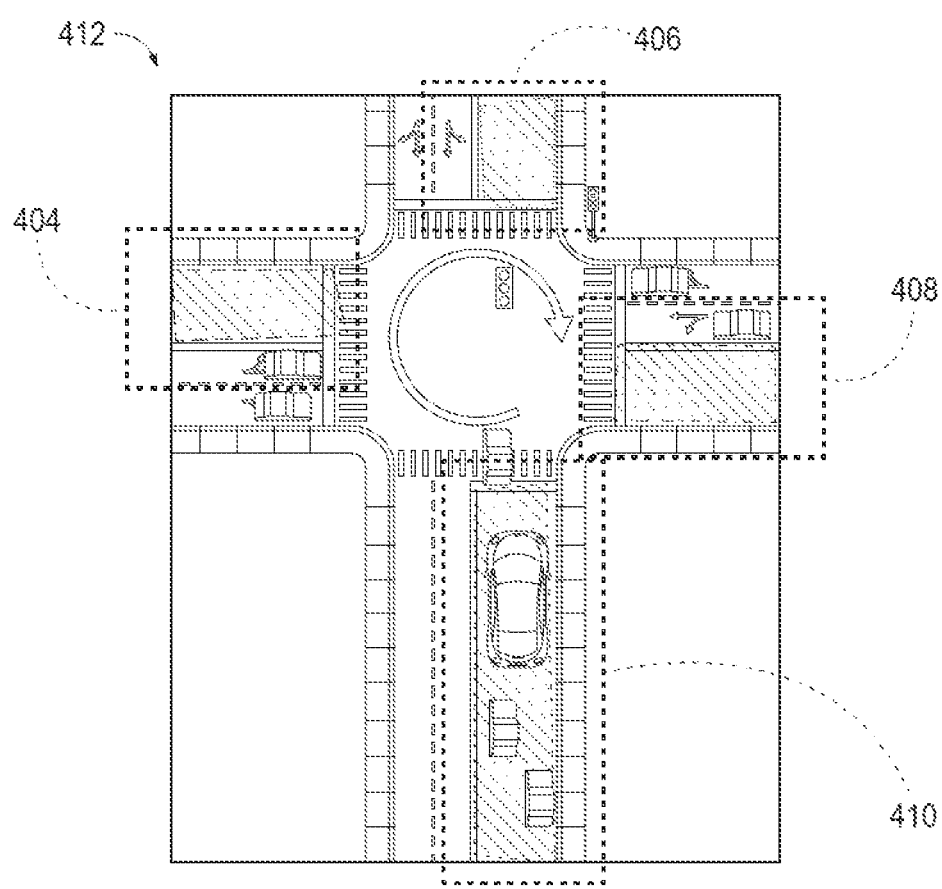
FIG. 4B is a generated BEV segmentation corresponding to the input image of FIG. 4A, according to one aspect.

At block 314, the method 300 includes the BEV segmentation module 126 generating a BEV image 412, shown in FIG. 4B, based on the feature map 512. The BEV image 412 is in top-down perspective space, generally orthogonal to the perspective space image of the input image 402, shown in FIG. 4A. For example, the BEV image 412 may predict the location of the features, including the first branch 404, the second branch 406, the third branch 408, and the ego branch 410.

Accordingly, the systems and methods described herein predict and generate the BEV image 412, which is generally preferred in many autonomous navigation tasks since the top-down view captures the essential spatial relationships on the ground plane. Furthermore, BEV semantic segmentation is an alternate, and often more useful method to monocular Simultaneous Localization and Mapping (SLAM) for online mapping, particularly in places where no map is available or where the map is updated due to unstructured and dynamically changing events such as construction, traffic incidents, and unexpected debris on the path. Accordingly, the BEV image 412 may be used to improve the functioning of the ego agent 202, such as autonomous navigation.

The BEV image 412 provides an intermediate representation that is interpretable and therefore facilitates identification of inherent failure modes in various upstream and downstream tasks. In addition, the BEV image 412 may easily consume perception results from perspective views and is extensible to other modalities which simplifies late fusion tasks.

Figure 7:
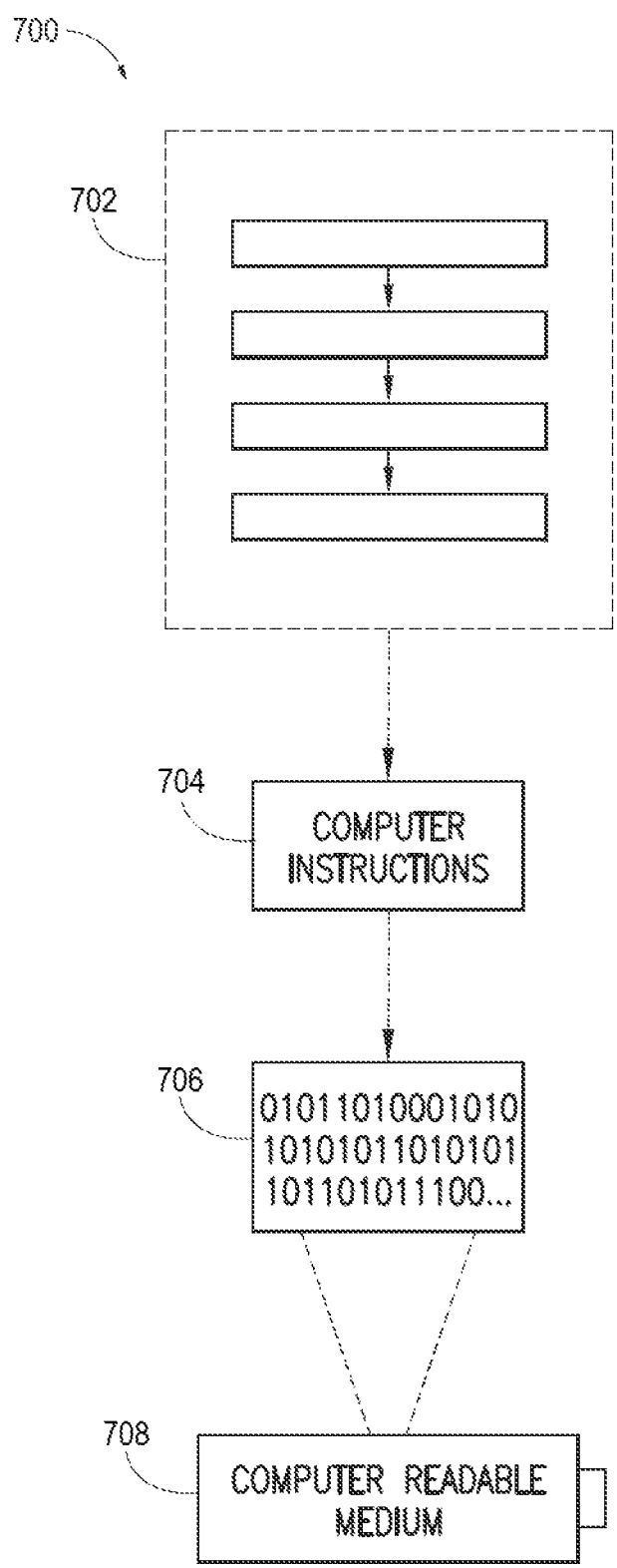
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 300 of FIG. 3. In another aspect, the processor-executable computer instructions 704 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
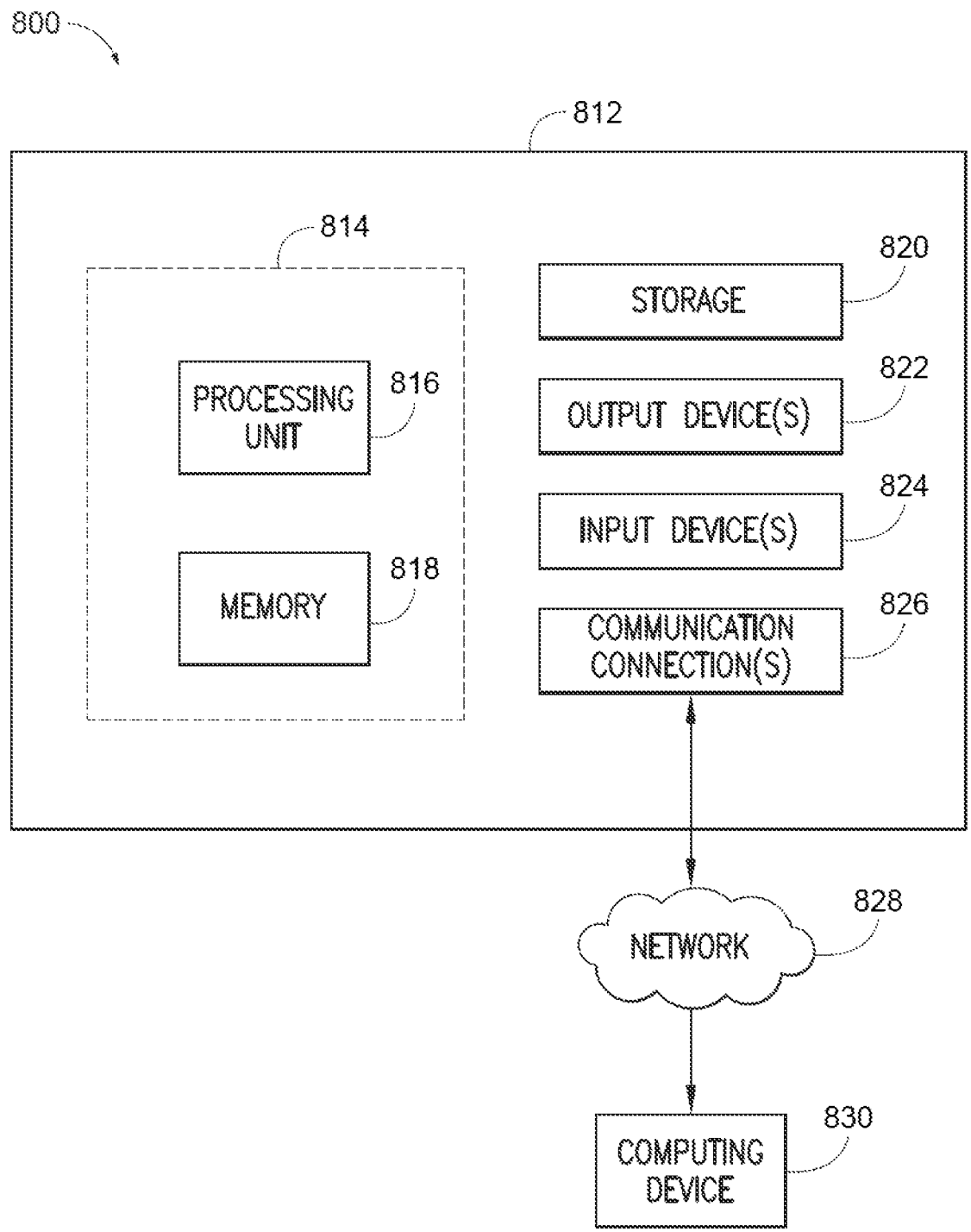
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including an apparatus 812 configured to implement one aspect provided herein. In one configuration, the apparatus 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the apparatus 812 includes additional features or functionality. For example, the apparatus 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 812. Any such computer storage media is part of the apparatus 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 812 includes input device(s) 824 such as keyboard, mouse, pen, voice input device, touch input device, infrared cameras, video input devices, or any other input device. Output device(s) 822 such as one or more displays, speakers, printers, or any other output device may be included with the apparatus 812. Input device(s) 824 and output device(s) 822 may be connected to the apparatus 812 via a wired connection, wireless connection, or any combination thereof. In one aspect, an input device or an output device from another computing device may be used as input device(s) 824 or output device(s) 822 for the apparatus 812. The apparatus 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for bird's eye view (BEV) segmentation, comprising:
 a memory storing instructions that when executed by a processor cause the processor to:
 receive an input image from an image sensor on an agent, wherein the input image is a perspective space image defined relative to a position and viewing direction of the agent, wherein the image sensor is associated with intrinsic parameters, and wherein the input image includes a plurality of pixels;
 extract features from the input image using a first neural network (NN), wherein a feature is a piece of information about the content of the input image;
 estimate a depth map that includes depth values for pixels of the plurality of pixels of the input image;
 generate a three-dimensional (3D) point map based on the depth map and the intrinsic parameters of the image sensor, wherein the 3D point map includes points corresponding to the pixels of the input image;
 generate a voxel grid by voxelizing the 3D point map into a plurality of voxels, wherein voxels of the plurality of voxels include a variable number of points, the voxel grid having a size width w in X direction, height h in Y direction and depth d in Z direction in (X, Y, Z) of 3D real world coordinates;
 apply the voxel grid for index referencing the input image as an indexed image, wherein features of a perspective frame based on the indexed image are combined with the voxel grid for feature fusion to predict a feature map;
 generate the feature map by extracting feature vectors for pixels based on the points included in the voxels of the plurality of voxels, wherein the feature vectors include a length feature vector for each voxel of the plurality of voxels, and the feature map is represented as a 4d feature map with a size height h, width w, depth d and length l; and generate a BEV segmentation based on the feature map.

2. The system for BEV segmentation of claim 1, wherein the image sensor is a monocular camera.

3. The system for BEV segmentation of claim 1, wherein the depth map is estimated based on a second NN.

4. The system for BEV segmentation of claim 1, wherein the 3D point map is a point cloud.

5. The system for BEV segmentation of claim 1, wherein the BEV segmentation is a BEV image including BEV segmentation predictions.

6. The system for BEV segmentation of claim 1, wherein generating the BEV segmentation includes processing the feature map with a BEV NN.

7. A method for bird's eye view (BEV) segmentation, comprising:
   receiving an input image from an image sensor on an agent, wherein the input image is a perspective space image defined relative to a position and viewing direction of the agent, wherein the image sensor is associated with intrinsic parameters, and wherein the input image includes a plurality of pixels;
   extracting features from the input image using a first neural network (NN), wherein a feature is a piece of information about the content of the input image;
   estimating a depth map that includes depth values for pixels of the plurality of pixels of the input image;
   generating a three-dimensional (3D) point map based on the depth map and the intrinsic parameters of the image sensor, wherein the 3D point map includes points corresponding to the pixels of the input image;
   generating a voxel grid by voxelizing the 3D point map into a plurality of voxels, wherein voxels of the plurality of voxels include a variable number of points, the voxel grid having a size width w in X direction, height h in Y direction and depth d in Z direction in (X, Y, Z) of 3D real world coordinates;
   applying the voxel grid for index referencing the input image as an indexed image, wherein features of a perspective frame based on the indexed image are combined with the voxel grid for feature fusion to predict a feature map;
   generate the feature map by extracting feature vectors for pixels based on the points included in the voxels of the plurality of voxels, wherein the feature vectors include a length feature vector for each voxel of the plurality of voxels, and the feature map is represented as a 4d feature map with height h, width w, depth d and length l; and
   generating a BEV segmentation based on the feature map.

8. The method for BEV segmentation of claim 7, wherein the image sensor is a monocular camera.

9. The method for BEV segmentation of claim 7, wherein the depth map is estimated based on a second NN.

10. The method for BEV segmentation of claim 7, wherein the 3D point map is a point cloud.

11. The method for BEV segmentation of claim 7, wherein the BEV segmentation is a BEV image including BEV segmentation predictions.

12. The method for BEV segmentation of claim 7, wherein generating the BEV segmentation includes processing the feature map with a BEV NN.

13. The method for BEV segmentation of claim 12, wherein the BEV NN is trained using a dataset that include training images, in both perspective view and BEV, that are annotated with labels.

14. The method for BEV segmentation of claim 13, wherein the training images are also annotated with classes associated with characteristics, and wherein the classes are populated by attributes.

15. A non-transitory computer readable storage medium storing instructions that when executed by a computer having a processor to perform a method for bird's eye view (BEV) segmentation, the method comprising:
   receiving an input image from an image sensor on an agent, wherein the input image is a perspective space image defined relative to a position and viewing direction of the agent, wherein the image sensor is associated with intrinsic parameters, and wherein the input image includes a plurality of pixels;
   extracting features from the input image using a first neural network (NN), wherein a feature is a piece of information about the content of the input image;
   estimating a depth map that includes depth values for pixels of the plurality of pixels of the input image;
   generating a three-dimensional (3D) point map based on the depth map and the intrinsic parameters of the image sensor, wherein the 3D point map includes points corresponding to the pixels of the input image;
   generating a voxel grid by voxelizing the 3D point map into a plurality of voxels, wherein voxels of the plurality of voxels include a variable number of points, the voxel grid having a size width w in X direction, height h in Y direction and depth d in Z direction in (X, Y, Z) of 3D real world coordinates;
   applying the voxel grid for index referencing the input image as an indexed image, wherein features of a perspective frame based on the indexed image are combined with the voxel grid for feature fusion to predict a feature map:
   generating the feature map by extracting feature vectors for pixels based on the points included in the voxels of the plurality of voxels, wherein the feature vectors include a length feature vector for each voxel of the plurality of voxels, and the feature map is represented as a 4d feature map with a size height h, width w, depth d and length l; and
   generating a BEV segmentation based on the feature map.

16. The non-transitory computer readable storage medium implemented method of claim 15, wherein the image sensor is a monocular camera.

17. The non-transitory computer readable storage medium implemented method of claim 15, wherein the 3D point map is a point cloud.

18. The non-transitory computer readable storage medium implemented method of claim 15, wherein generating the BEV segmentation includes processing the feature map with a BEV NN.

19. The non-transitory computer readable storage medium implemented method of claim 18, wherein the BEV NN is trained using a dataset that include training images, in both perspective view and BEV, that are annotated with labels.

20. The non-transitory computer readable storage medium implemented method of claim 19, wherein the training images are also annotated with classes associated with characteristics, and wherein the classes are populated by attributes.

* * * * *